United States Patent [19]

Londt et al.

[11] Patent Number: 5,017,916
[45] Date of Patent: May 21, 1991

[54] SHIFT PROMPTER/DRIVER INFORMATION DISPLAY

[75] Inventors: Edward E. Londt, Ft. Wayne; James W. Kruse, New Haven, both of Ind.

[73] Assignee: Navistar International Transportation Corp., Chicago, Ill.

[21] Appl. No.: 321,481

[22] Filed: Mar. 9, 1989

[51] Int. Cl.$^5$ ............................ G06F 3/14; B60Q 1/00
[52] U.S. Cl. .............................. 340/870.130; 340/439; 340/461; 364/424.1
[58] Field of Search ............................ 364/442, 424.1; 340/438, 439, 441, 453, 456, 461, 462, 870.13

[56] References Cited

U.S. PATENT DOCUMENTS

| | | | |
|---|---|---|---|
| D. 275,944 | 10/1984 | Ito | D12/192 |
| D. 276,039 | 10/1984 | Tanaka | D12/192 |
| D. 277,176 | 1/1985 | Komuro | D12/192 |
| 4,267,545 | 3/1981 | Drone et al. | 340/439 |
| 4,419,654 | 12/1983 | Funk | 340/438 |
| 4,447,860 | 5/1984 | Stone et al. | 362/30 |
| 4,463,427 | 7/1984 | Bonnetain et al. | 364/442 |
| 4,494,404 | 1/1985 | Strifler | 73/113 |
| 4,539,868 | 9/1985 | Habu | 364/424.1 |
| 4,544,909 | 10/1985 | DiNunzio | 340/439 |
| 4,570,226 | 2/1986 | Aussedat | 364/442 |
| 4,593,357 | 6/1986 | Van Ostrand et al. | 340/439 |
| 4,622,637 | 11/1986 | Tomita et al. | 364/424.1 |
| 4,635,034 | 1/1987 | Tokuyama et al. | 340/441 |
| 4,663,718 | 5/1987 | Augello et al. | 364/444 |
| 4,683,455 | 7/1987 | Kido et al. | 340/439 |
| 4,701,852 | 10/1987 | Ulveland | 364/424.1 |
| 4,706,083 | 11/1987 | Baatz et al. | 340/825.06 |
| 4,723,215 | 2/1988 | Hibino et al. | 364/424.1 |
| 4,800,360 | 1/1989 | Dunkley et al. | 340/456 |

Primary Examiner—Donald J. Yusko
Assistant Examiner—Yuk H. Lau
Attorney, Agent, or Firm—Dennis K. Sullivan

[57] ABSTRACT

A shift prompter/driver information display for a highway truck is disclosed. The display is operable to cruising, prompting, and shifting modes of operation. In the cruising mode of operation the driver of the vehicle can select, via a set of keypad switches, information about the vehicle's operation that he desires to see presented on a multi-digit decimal readout of the display. Information concerning fuel economy, engine speed, vehicle speed, travel time, travel distance and engine hours can be selected. In the prompting mode of operation the display indicates that operation of the transmission to a different gear is appropriate. The shifting mode commences when the driver initiates a shift to a different gear. In the shifting mode the target gear to which the transmission should be shifted is presented on the display. Additional displays are included to aid the driver in completing the shifting procedure and these involve indicating when the engine speed is substantially equal to the synchronous meshing speed of the target gear. One of these is a linear analogue display that is associated with the digital display and is operational in both the cruising mode and in the shifting mode; in the shifting mode it indicates approach of engine speed to synchronous meshing speed, and in the cruising mode it indicates actual fuel economy relative to a desired fuel economy goal.

11 Claims, 12 Drawing Sheets

FIG. 3

INTEGRATED POWER TRAIN LCD DISPLAY FUNCTIONS AND MODELS

```
            ┌── INST. ───── INSTANTANEOUS MPG
            │
MPG ────────┼── AVG. ────── AVERAGE MPG SINCE LAST RESET
            │
            └── GOAL ────── DRIVER SELECTED MPG GOAL (INPUT MODE)

RPM ────────── INST. ────── REAL TIME ENGINE SPEED

MPH ────────── AVG. ─────── AVERAGE ROAD SPEED SINCE LAST RESET

┌── TOTAL ───── TOTAL TIME ELAPSED SINCE LAST RESET
TIME ───────┤
            └── REMAIN ──── TIME TO DESTINATION BASED ON CURRENT SPEED

┌── TOTAL ───── TOTAL MILES SINCE LAST RESET (COUNT UP)
            │
MILES ──────┼── GOAL ────── DRIVER SELECTED DESTINATION MILEAGE (INPUT MODE)
            │
            └── REMAIN ──── MILES TO DESTINATION (COUNT DOWN)

┌── TOTAL ───── TOTAL ENGINE HOURS AS A FUNCTION OF RPM
ENG.        │
HRS. ───────┼── GOAL ────── DRIVER SELECTED OIL CHANGE INTERVAL (INPUT MODE)
            │
            └── REMAIN ──── ENGINE HOURS REMAINING UNTIL OIL CHANGE
```

MAIN JOB SERVICE ROUTINE

FUEL DATA AND ENGINE HOUR COMPUTATION ROUTINE.

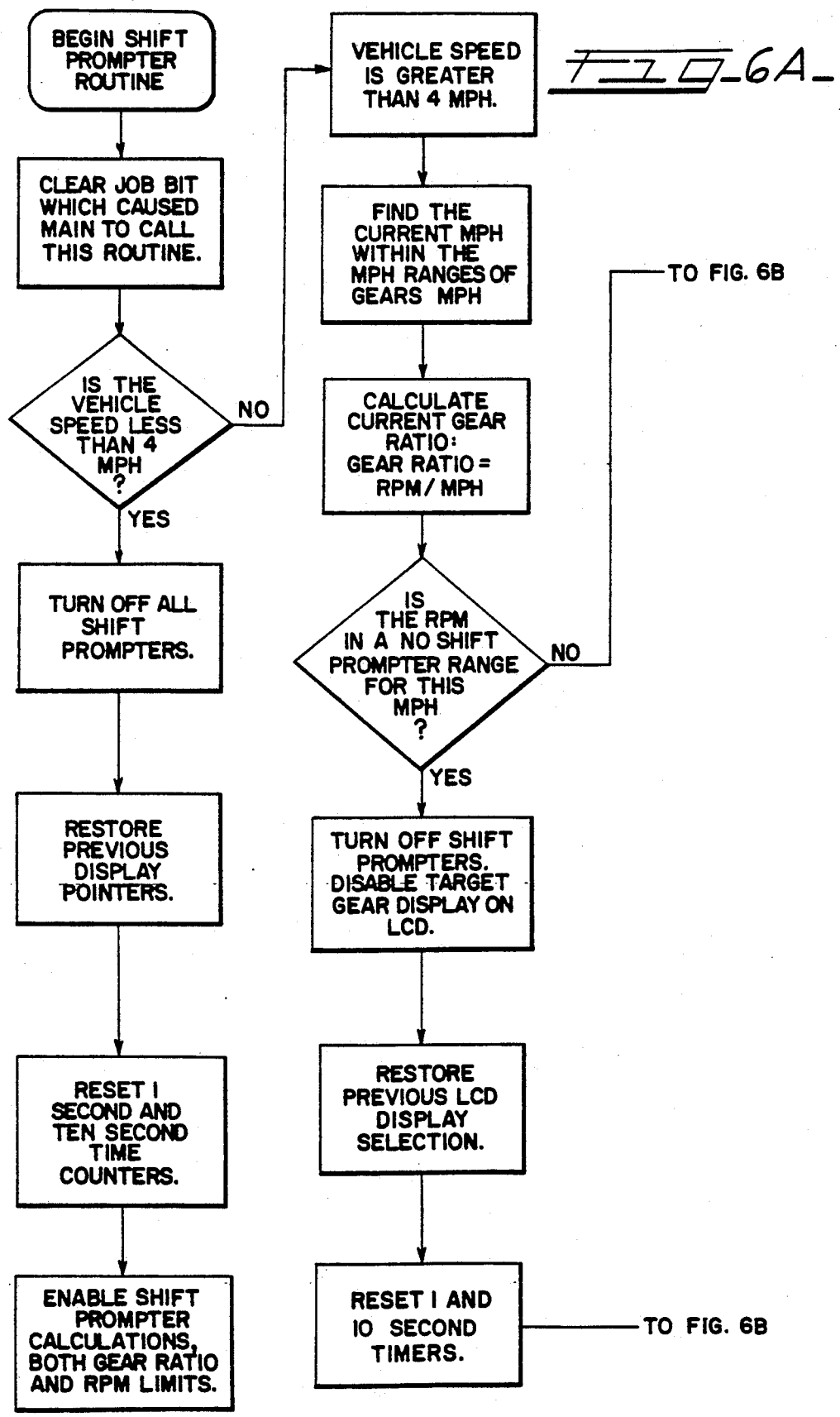

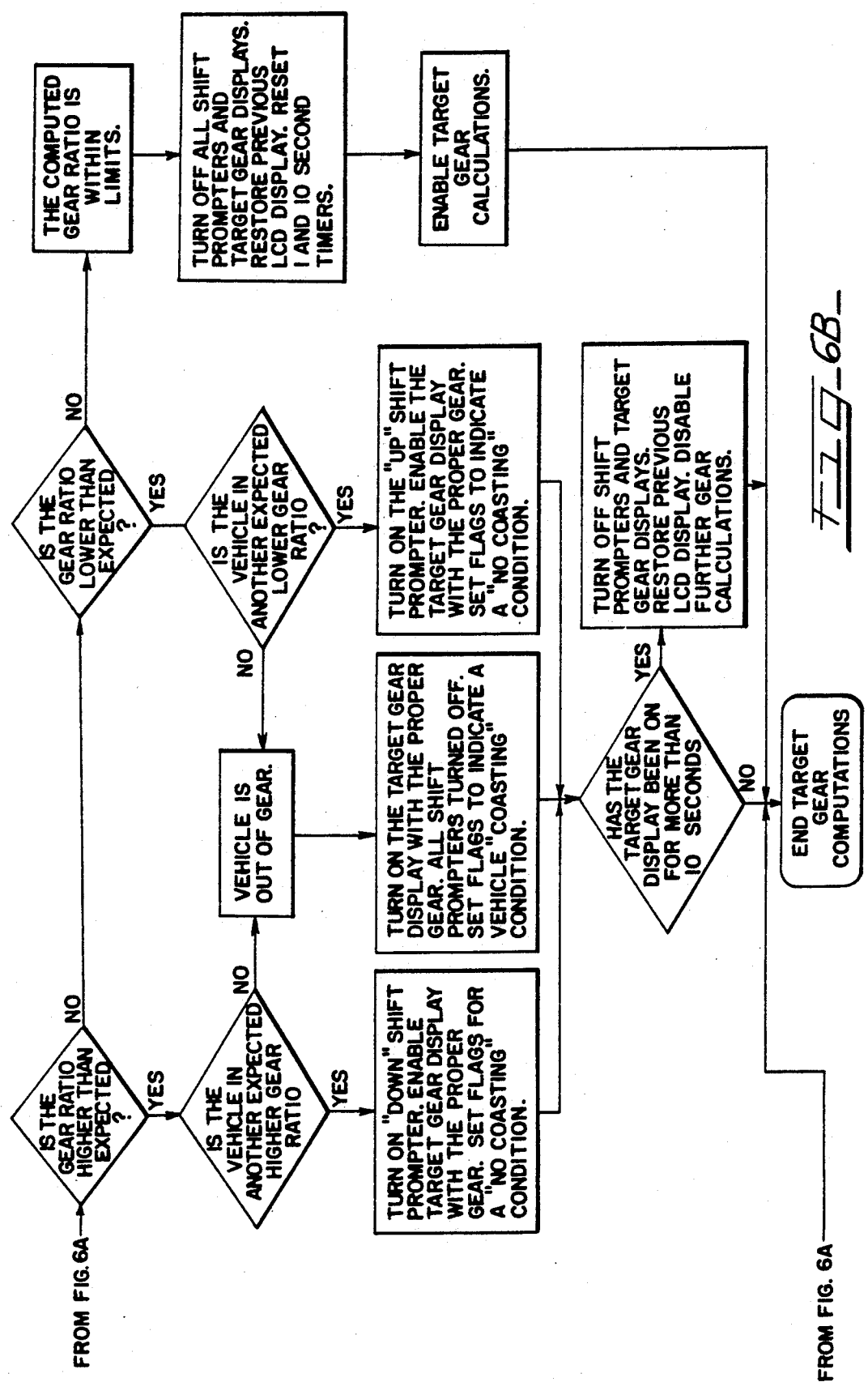

RPM DATA COMPUTATION ROUTINE

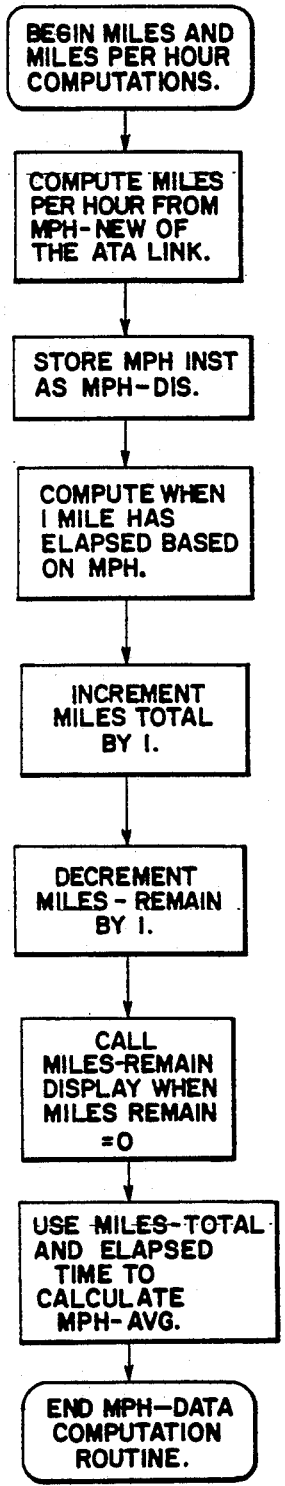
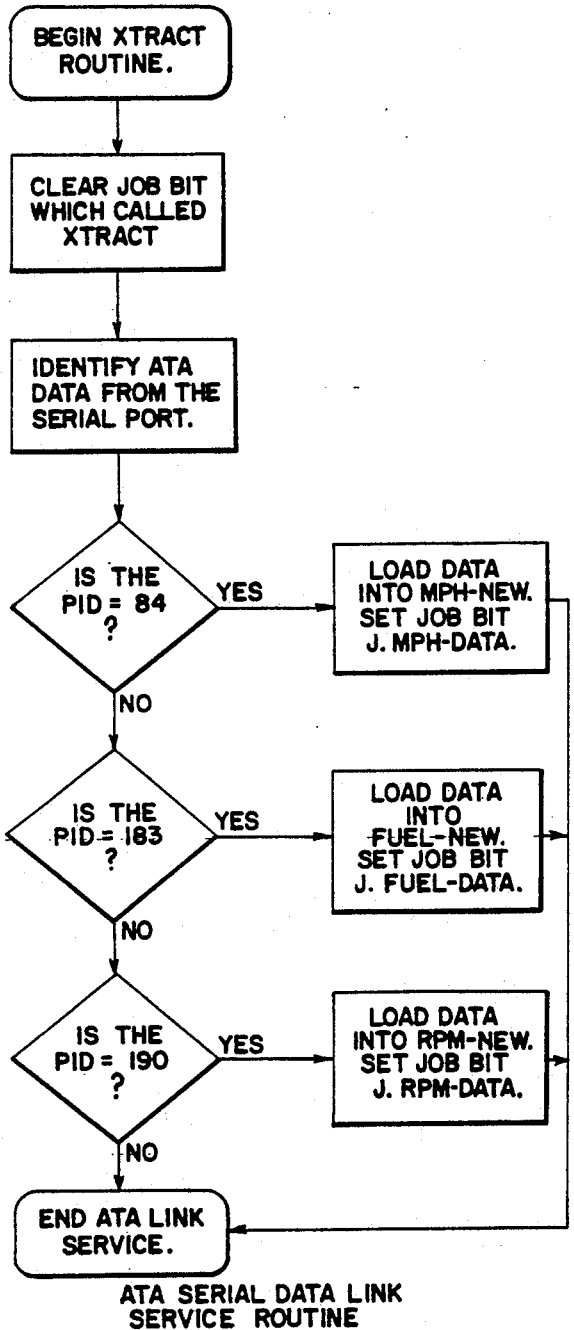
MILE PER HOUR DATA COMPUTATION ROUTINE
ATA SERIAL DATA LINK SERVICE ROUTINE

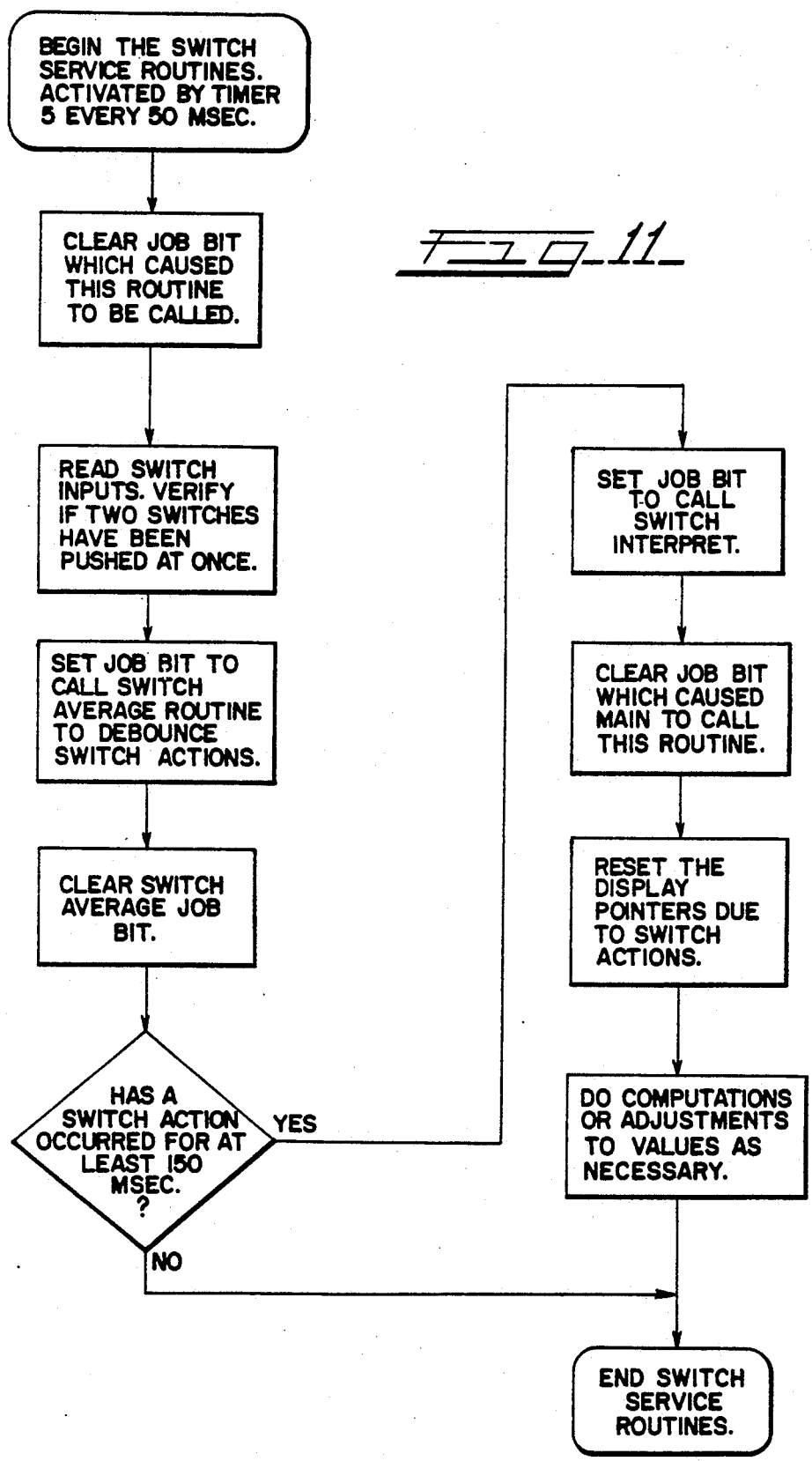
SWITCH SERVICE ROUTINES

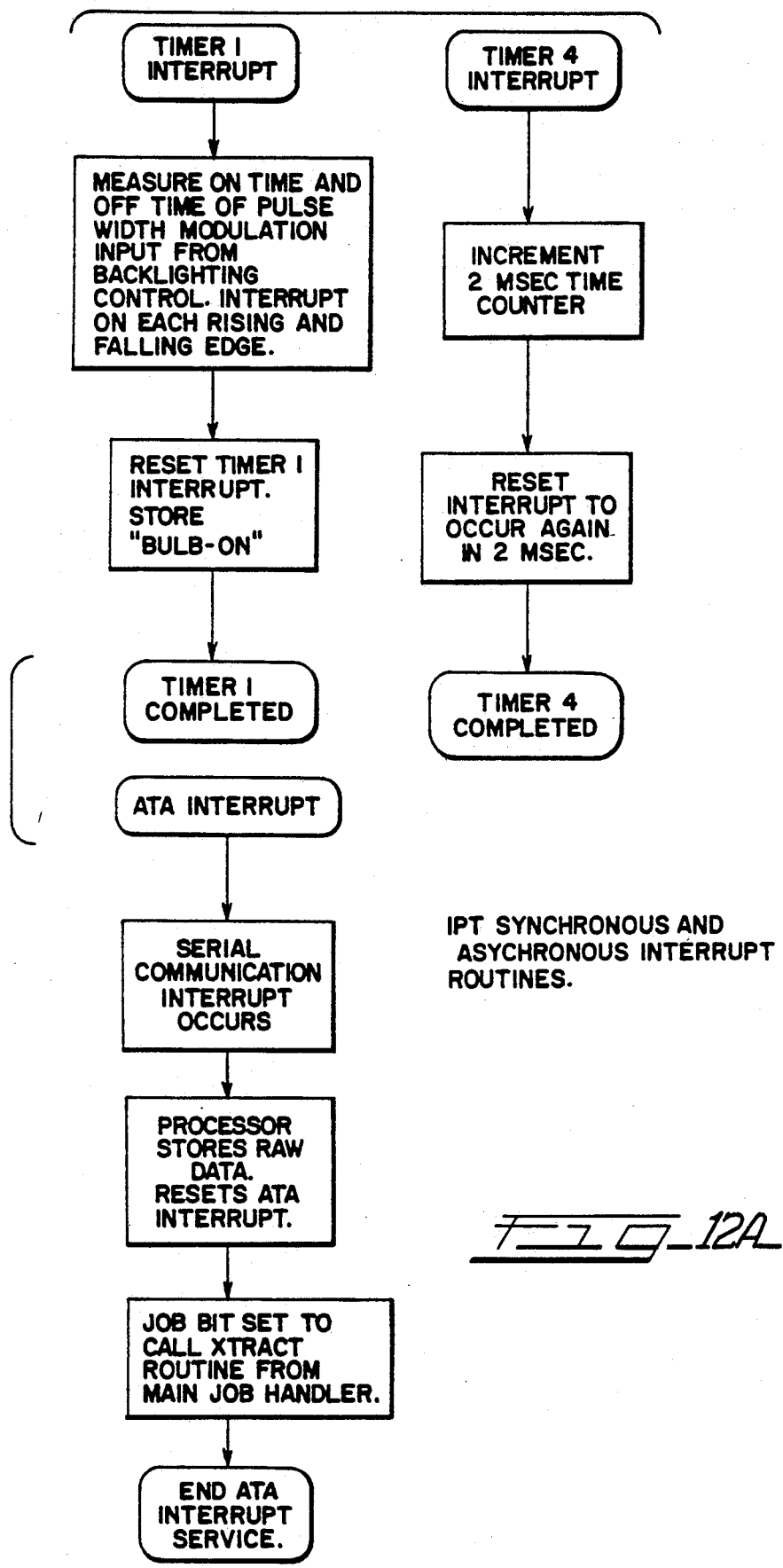
FIG_12A
IPT SYNCHRONOUS AND ASYNCHRONOUS INTERRUPT ROUTINES.

IPT SYCHRONOUS AND ASYCHRONOUS INTERRUPT ROUTINES

SHIFT PROMPTER/DRIVER INFORMATION DISPLAY

BACKGROUND AND SUMMARY OF THE INVENTION

This invention relates generally to instrumentation displays for automotive vehicles; more specifically it relates to a shift prompter/driver information display for a highway truck.

The development of microelectronic circuits that are suitable for automobile usage has resulted in the creation of information displays for presenting useful information to the driver of the vehicle.

Typical data that is presented by an on-board microcomputer-based display comprises; engine speed, vehicle speed, fuel consumption, truck mileage, elapsed trip time. Instantaneous and average values of these parameters can also be displayed. Examples of such displays are found in the following U.S. Pat. Nos.: 4,447,860; 4,463,427; D 275,944; D 276,039; D 277,176; 4,635,034; 4,663,718; and 4,706,083.

Another form of display that is useful in certain motor vehicles is one that is used to indicate when a transmission is being operated in gear that for one reason or another is not the optimal gear for the particular operating conditions. The intent of displaying this type of information is to encourage the driver of the vehicle to shift to a more optimal gear. Typically these gear change signaling systems monitor fuel consumption and are intended to inform the driver that better fuel economy can be obtained in a different gear and therefore they serve to encourage the driver to shift to a gear that will result in more economical fuel consumption.

Examples of change gear signaling systems are found in the following U.S. Pat. Nos.: 4,494,404; 4,539,868; 4,544,909; 4,570,226; 4,683,455; and 4,701,852.

The present invention relates to a new and improved integrated powertrain display in which information about the operation of the vehicle powertrain is presented to the driver of the vehicle in a display that is organized and arranged in a new and unique format. The display is operable to three different modes of operation which are respectively referred to as the cruise mode, the prompt mode, and the shift mode.

The cruise mode of operation is characterized by engagement of the clutch and the transmission in gear. In the cruise mode of operation the display presents information concerning the powertrain operation and selected by the driver from the following functions: fuel economy; engine speed; vehicle speed; trip time; trip distance; and engine operating time. A particular generalized function (principal category of information) that is selected for display by the driver of the vehicle is often characterized by different modes (or sub-categories) and therefore the display has: the ability to further refine the selection in terms of a particular selectable mode. In the illustrated display these selectable modes are as follows: total; goal; average; instantaneous; and remaining. Obviously not all of these modes are applicable to all of the functions. For example, the remaining mode would have no meaning with respect to engine speed. However, in the case of fuel economy the instantaneous, the goal and the average modes would all be applicable.

The prompt mode of operation is initiated during the cruising mode whenever the microcomputer control determines that the transmission should be operated in a different gear from the particular gear in which it is presently operating. Accordingly, the display contains an upshift indicator and downshift indicator that are activated whenever upshifting or downshifting is called for. The intent is that the driver will observe the signal for either an upshift or a downshift and then make the appropriate gear change.

The display operates to the shift mode whenever the control determines that the driver is in the process of shifting the transmission. Specifically the shift mode occurs when either the clutch pedal is depressed and/or the transmission lever is placed in neutral. The display advises the driver of the identity of the target gear that is indicated and it also activates a two color indicator lamp that is used to aid the shifting. The two color indicator lamp serves the purpose of indicating, first by one color (red), the initiation of a non-proportionality indicative of a shifting operation being in progress; then once the engine speed has been brought to a speed that is within a predetermined range of synchronous speed for the target gear, the light switches to the second color (green) indicating that the shift can be completed. Once the transmission has been placed into gear and the clutch reengaged, the shift mode of operation ceases and the display reverts to the cruising mode of operation.

Associated with a numerical digital read-out of the display is an analogue display that is in the form of a series of bars that can be selectively illuminated. The particular number of segments that are illuminated produces a corresponding illuminated length of this analogue display, and hence by controlling the number of segments that are illuminated, the length of the display is selectively illuminated. The length is related to different functions in the cruise and shift modes of operation of the display. In the cruise mode of operation, the analogue display provides a useful analogue indication in conjunction with a digital miles per gallon display and in the shift mode of operation the analogue display can provide an indication of the approach of engine speed to synchronous gear meshing speed.

The foregoing, along with additional features, advantages, and benefits of the invention, will be seen in the ensuing description and claims which should be considered in conjunction with the accompanying drawings. The drawings disclose a presently preferred embodiment of the invention according to the best mode contemplated at the present time in carrying out the invention.

BRIEF DESCRIPTION OF THE DRAWINGS

FIG. 3 is a chart illustrating the categories and sub-categories of information that can be displayed on the display of FIG. 2.

FIGS. 4–12 are respective flow diagrams for various routines that are performed by the microcomputer shown in FIG. 1.

DESCRIPTION OF THE PREFERRED EMBODIMENT

Figure 1:
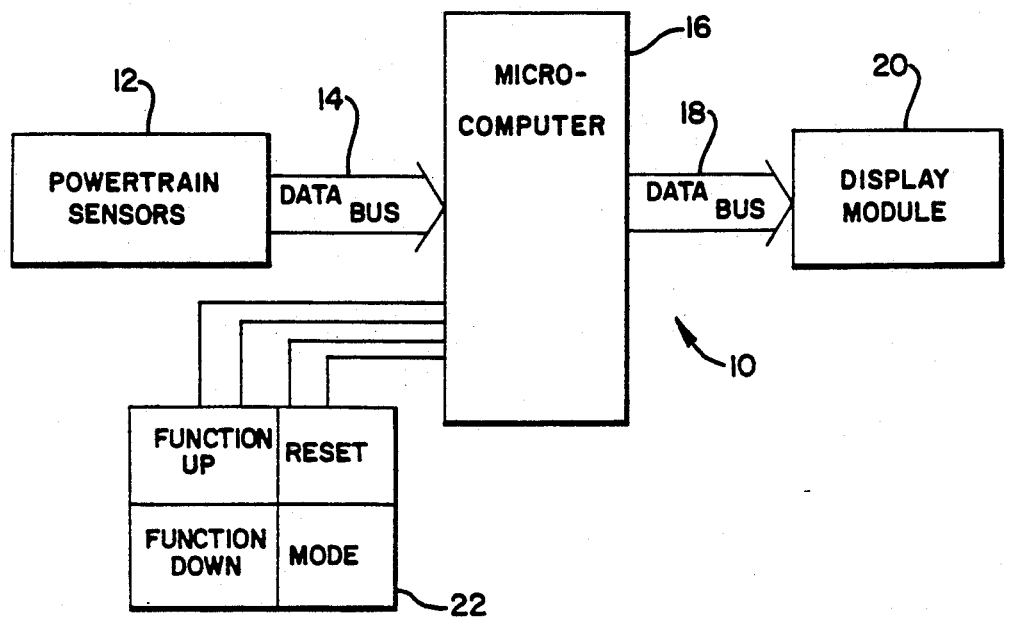
FIG. 1 is a schematic block diagram of the shift prompter/driver information display of the present invention.

The shift prompter/driver information display 10 of the present invention comprises a number of different powertrain sensors, 12 generally, that are coupled via a data bus 14 to a microcomputer control, 16 generally. The microcomputer control 16 is in turn coupled via a data bus 18 to a display module 20. Also forming an input to the microcomputer control 16 is a set of four keypad switches, 22 generally.

Display module 20 is located in the instrument cluster of the vehicle where it is readily visible to the driver of the vehicle. The set of keypad switches 22 is disposed in a location where they can be conveniently depressed by the driver whenever particular information is desired to be displayed and/or certain display parameters are to be set or reset.

The powertrain sensors are mounted at various locations on the vehicle's powertrain to provide inputs to microcomputer control 16 via data bus 14. Examples of powertrain sensors that are used in conjunction with the display are a fuel rate sensor that measures the rate at which fuel is being combusted in the engine, an engine speed sensor that provides a signal of engine speed, and a vehicle speed sensor that provides a signal of vehicle speed. Additional inputs from the powertrain include switches which indicate whether the clutch is engaged or disengaged and whether the transmission is in or out of gear. The microcomputer contains its own clock circuit that is used to develop time information.

Figure 2:
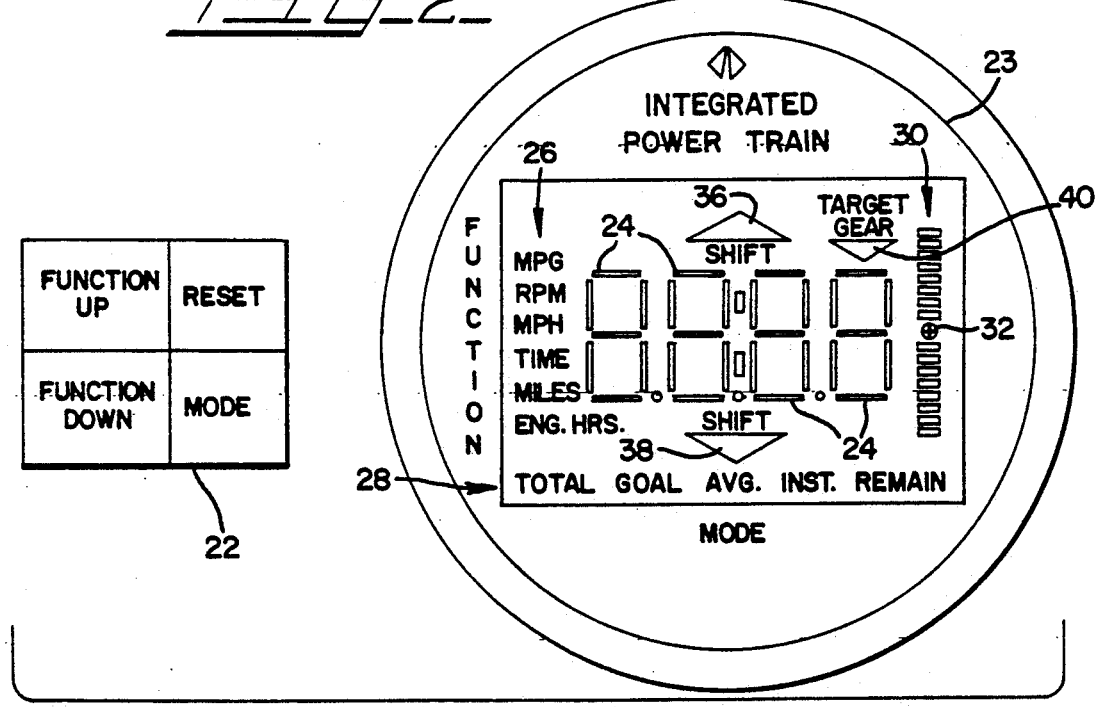
FIG. 2 is a detailed view of the module that contains the display.

FIG. 2 shows further details of display module 20. The display module is contained within a container 23 that is adapted to fit into an instrument cluster space previously allocated to a tachometer. While the display is capable of providing engine tachometric information, it provides a multitude of additional pieces of information that provide the driver with more judicious information to assist him than is available with a standard tachometer type of display.

The display functions in three modes of operation: cruising; prompting; and shifting. The cruising mode of display is automatically brought into operation whenever the transmission is in gear and the clutch is engaged. The display serves to provide a digital indication to the driver of the value of various categories of information associated with powertrain operation. While the display is designed to default to displaying engine tachometer information, other information can be displayed through use of the keypad switch 22. Exactly how this occurs will be explained in more detail later on.

In the prompting mode of operation the microcomputer 16 senses conditions of certain of the powertrain sensors that indicate that shifting from the presently selected transmission gear to another gear is desirable. For example, the microcomputer may sense conditions indicating that better fuel economy can be obtained by upshifting to a higher gear. As another example, the microcomputer can sense conditions that are suggestive of a need to downshift.

The shift mode of operation is automatically activated whenever the microcomputer senses that the transmission is in the process of being shifted. Specifically the shift mode state occurs when the clutch pedal is depressed to disengage the clutch and/or the transmission lever is placed in a neutral position to disengage the transmission. During the shift mode of operation a target gear to which the engine should be shifted is indicated on the display and the display also indicates the instantaneous relationship of engine speed to the synchronous meshing speed of the target gear to inform the driver when the engine speed is substantially synchronous with the synchronous meshing speed of the target gear so that the shifting of the transmission to the target gear can be completed substantially at the synchronous meshing speed. Having briefly described the three modes of operation of the display, attention can now be directed to more specific details of each of these three particular modes.

Cruising Mode

Basically the cruising mode presents information to the driver in what may be considered the manner of a trip computer. The means by which this information is presented is unique.

The display shown in FIG. 2 comprises a four digit decimal display 24 that consists of conventional seven segment bars that are selectively illuminated to display decimal numbers. The value of data presented appears on display 24.

The particular data presented is organized by category (function) and sub-category (mode). Running vertically along the left hand side of display 24 are a series 26 of six data categories, namely MPG (fuel economy in miles per gallon); RPM (engine speed in revolutions per minute); MPH (vehicle speed in miles per hour); Time (in minutes and seconds); Miles (distance in terms of miles); Engine Hours (engine operating time as measured in hours). Running horizontally along the bottom of the display are the following sub-categories 28: Total; Goal; Average (Avg.); Instantaneous (Inst.); Remaining (Remain).

When a value is being presented on display 24, the appropriate one of the six function categories and the appropriate one of the five mode sub-categories is illuminated. For example if the information presented on display 24 were the instantaneous fuel consumption, MPG would be illuminated under the function categories and Inst. would be illuminated under the mode sub-categories.

FIG. 3 identifies thirteen sub-categories of information that can be presented on display 24. Under the category MPG, instantaneous, Average and Goal sub-categories can be provided; under the category RPM, the Instantaneous sub-category can be provided; under the MPH category, the Average sub-category can be provided, under the Time category the Total and Remaining sub-categories can be provided; under the Miles category, Total, Goal and Remaining sub-categories can be provided; and under the Engine Hours category, the Total, Goal and Remaining sub-categories can be provided.

Keypad switch 22 is used to select the particular category and sub-category. The keypad has four individual switches labeled "function-up", "function-down", "reset", and "mode". The function-up and function-down switches are used in selecting the particular function, or category. The two switches are arranged to cause a scrolling of the function indicators. As such, only one of the function indicators is illuminated at any particular time. Pressing the function-up switch will cause an upward scrolling whereby the particular function that is illuminated will move upwardly along the indicators; in similar manner, depressing the function-down switch will cause a downward scrolling wherein the illuminated indicator will move downwardly.

The mode switch is used to select the particular sub-category, but it only has uni-directional scrolling. Thus, depressing the mode switch will cause the illuminated sub-category to move from left to right across the display with the scrolling wrapping around from right hand end to left hand end. The bi-directional scrolling of the function indicators also has wrap around.

Therefore, in order to have a particular piece of information presented on display 24 the driver depresses the function-up and/or function-down keys and the mode key in such a manner that the desired category indicator and sub-category indicator are illuminated. When these are illuminated the corresponding value of that selected data appears on display 24. For example by depressing the function-up and/or function-down switches to illuminate the MPG category and by operating the mode switch to the average sub-category, display 24 will present the average MPG since it was last reset. The average can be obtained by the microcomputer performing calculations on the fuel rate and distance traveled, the distance traveled being obtained by integrating the vehicle speed signal. In corresponding manner, the microcomputer performs other calculations as required in order to produce the values for the various sub-categories of information that can be presented on display 24.

At the far right of display 22 is a display segment in the form of an indicator bar 30. The bar extends in two equal lengths from a center point 32. The bar comprises a number of individual consecutive segments each of which can be selectively illuminated. By controlling the extent of illumination from the center point, the indicator can function as an analogue type display. In the implementation of the present invention the display functions to indicate the extent to which the value of a particular selected sub-category of information that is presented on the multi-digit numerical display 24 is above or below a target value. In the case of fuel economy it is used to show the extent to which the actual fuel economy is above or below a goal that has been established for fuel economy by either the driver or the fleet operator. The target goal would be located at the center and the extent to which the display is illuminated above the center would show the extent to which the target fuel economy is being surpassed; correspondingly a length of illumination below the center target would show the extent to which fuel economy is not being attained.

Promoting Mode

When the microcomputer control senses from the powertrain sensors that the transmission is being operated in other than an optimal gear, the prompting mode comes into play. Display 22 contains an upshift lamp 36 and a downshift lamp 38. The upshift lamp is illuminated when upshifting of the transmission is sensed as being desirable while the downshift lamp is illuminated when downshifting of the transmission is sensed as being desirable.

Shift Mode

Upon initiating steps to shift the transmission from the presently selected gear to a new gear, the display automatically operates in the shift mode. Based upon information received from the powertrain sensors, microcomputer 16 determines the identity of the particular target gear to which the transmission should be shifted and causes this identification to be displayed on display 24. In the embodiment of the invention that is illustrated in FIG. 2 the least significant of the four digits of display 24 is used to identify the target gear. There is also associated with the shift mode of operation a target gear indicator lam 40 that directly overlies the least significant digit of display 24. This lamp is a two color lamp which can be selectively illuminated to two different colors, typically red and green.

Initiation of a shift is sensed whenever the transmission is shifted out of gear and/or the clutch pedal is depressed to disengage the clutch. The microcomputer senses when the engine speed and the vehicle road speed are no longer proportional indicating clutch disengagement and/or that the transmission lever has been moved into a neutral position. For non-proportional speeds greater than 20 RPM the target gear light will illuminate red. As the engine speed is adjusted to within 500 RPM of synchronous meshing speed of the target gear, the light will continue to glow red until the relative speed is within 10 RPM. At this time the indicator switches to green to inform the driver that the shift should be completed because the engine speed is substantially at the synchronous meshing speed for the target gear.

As a further aid to determining when the synchronous meshing speed will be reached, the analogue display 30 along the right side of the display is also used. The target gear is located at the center of the display. The extent to which the lighted segments extend either above or below the target gear speed indicates the extent to which engine speed is above or below the synchronous meshing speed for the target gear. As the speed is adjusted closer to synchronous speed, the extent to which the display is lighted decreases until finally only the center point 32 is left on and the synchronous speed indicator light 40 is activated green indicating that the driver can complete the shift into the target gear. After the shift has been completed the display reverts to the cruise mode of operation.

The microcomputer is programmed in accordance with the foregoing description so that the functions that have been described can be performed. FIGS. 4-12 present flow diagrams for various routines that are performed. The flow diagrams contain sufficient detail for a programmer of ordinary skill in the art to develop suitable programming of the microcomputer. Accordingly, and in the interest of conciseness, the illustrated flow diagrams will not be described in detail since they themselves contain detailed descriptions.

Figure 4:
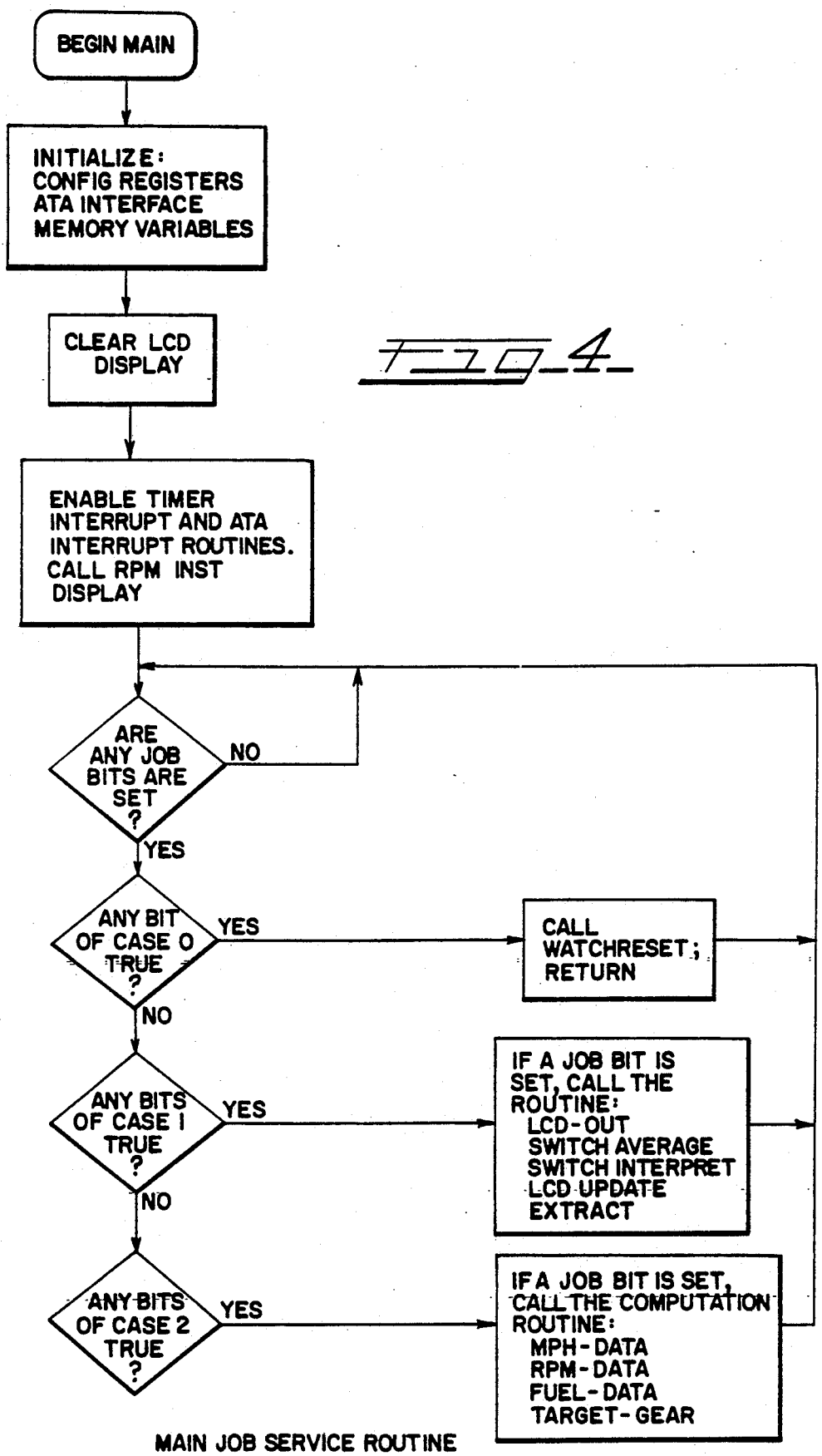
Figure 5:
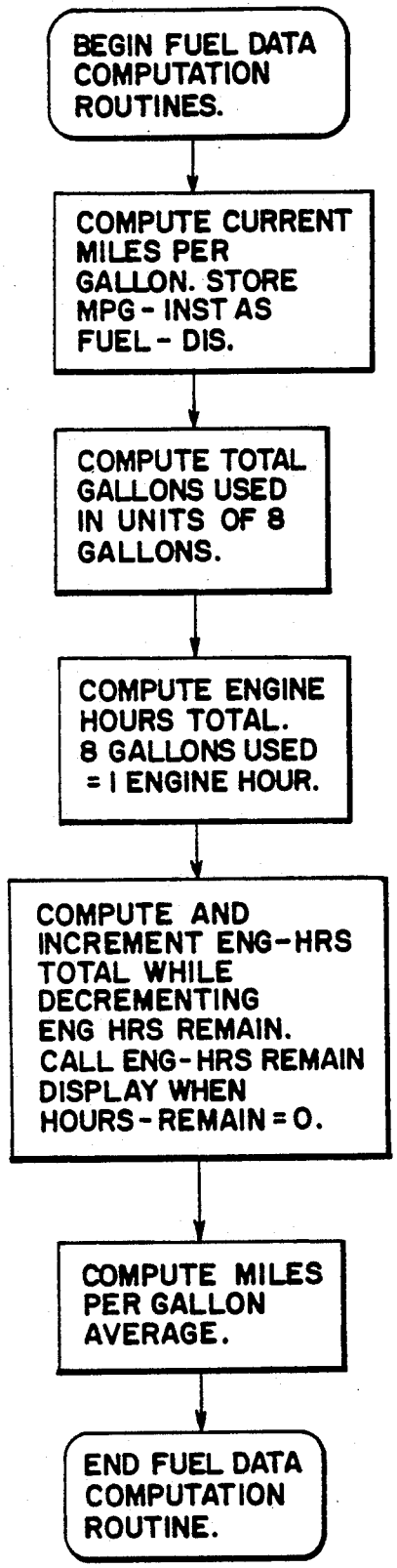
Figure 7:
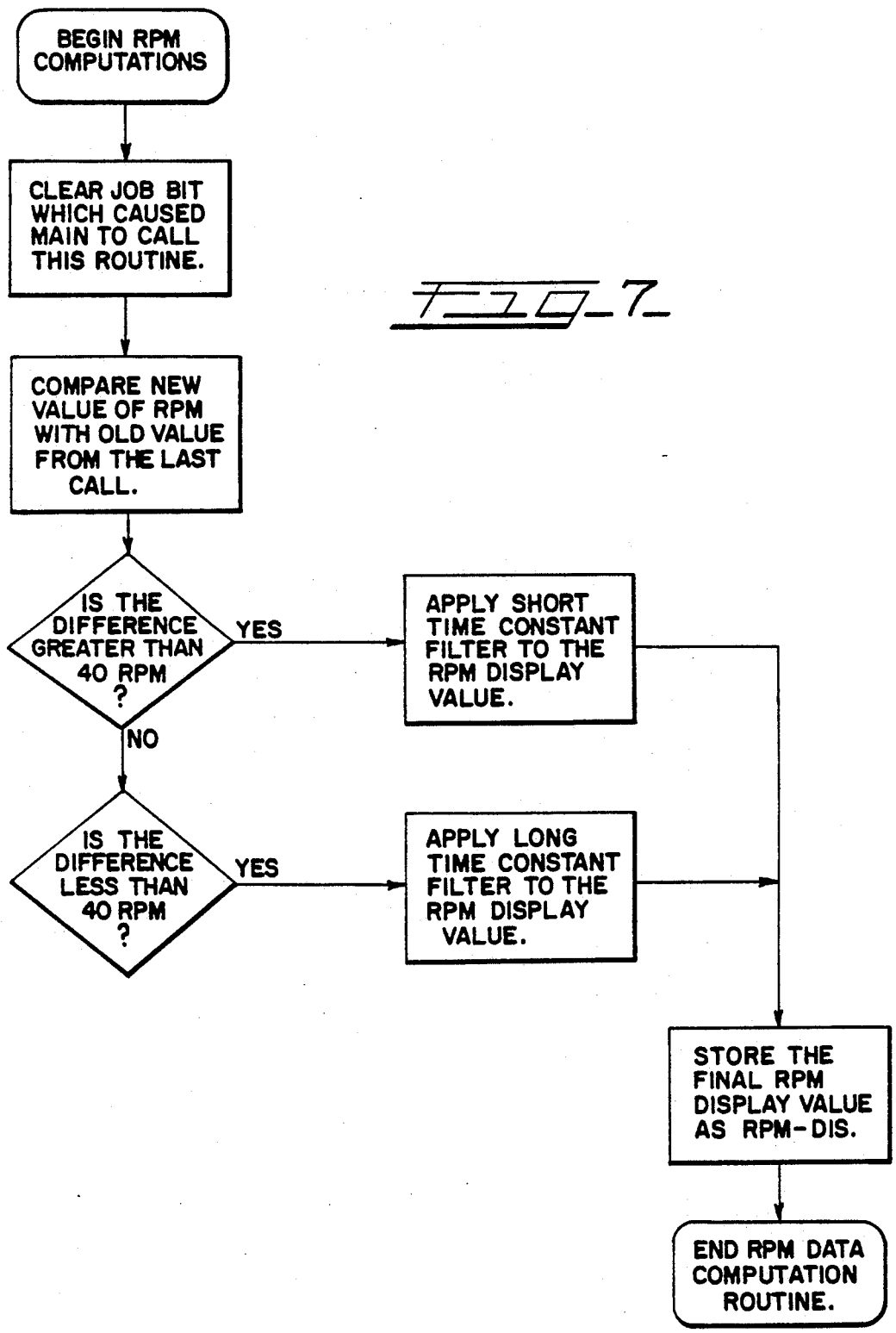
Figure 10:
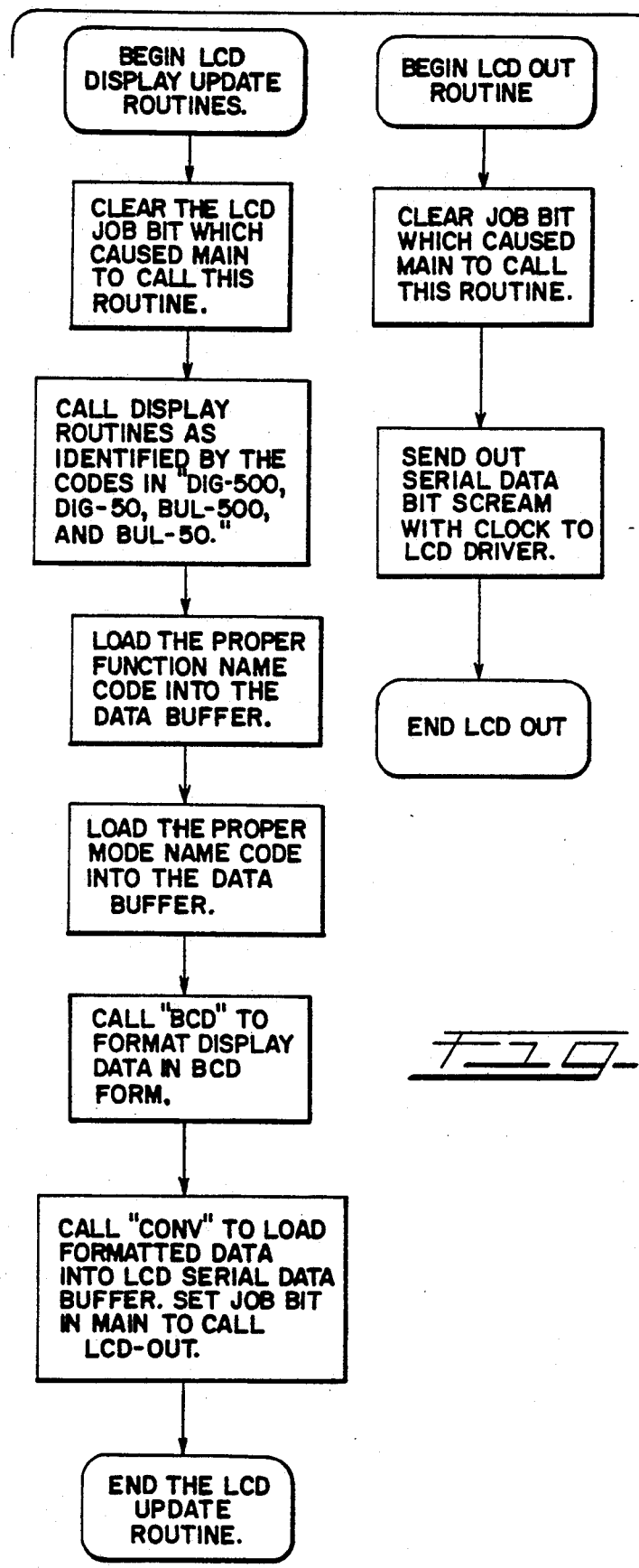
Figure 12B:
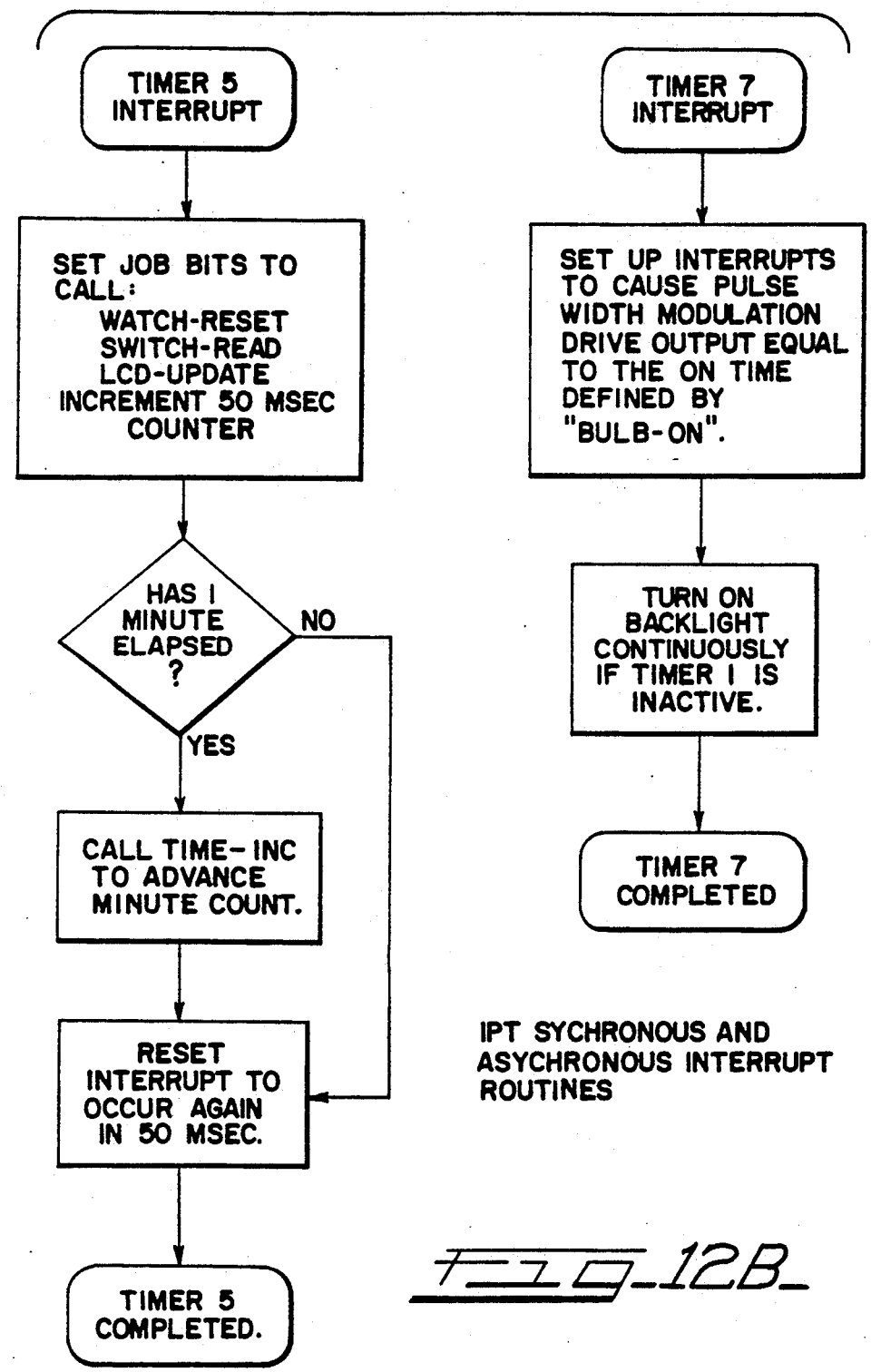

FIG. 4 shows the main job service routine which calls the computational routines. The computational routines are: fuel data and engine hour computation routine (FIG. 5); target gear computation routines (FIG. 6A and 6B); RPM data computation routine (FIG. 7); and mile per hour data computation routine (FIG. 8). The ATA serial data link service routine of FIG. 9 reads input data on the vehicle's data link. The routine of FIG. 10 updates and controls the display. The switch service routine of FIG. 11 reads the switch inputs. FIGS. 12A and 12B portray IPT synchronous and asynchronous interrupt routines.

From the foregoing description it can be seen that a display with multi-functional capabilities has been disclosed. In addition to providing information about general vehicle operation such as speed, distance, etc., the display is useful in aiding the driver to shift gears. While a preferred embodiment of the invention has been disclosed, it will be appreciated that principles are applicable to other embodiments.

What is claimed is:

1. For a vehicle having a powertrain which comprises an engine that drives a shiftable multi-gear transmission through a clutch, an on-board microcomputer-based display that provides information about the vehicle powertrain's operation to the driver of the vehicle in respective cruising, prompting, and shifting modes of operation and comprises:

a multi-digit numerical display section for displaying decimal values;

information category selection means for selecting a particular category of information about the vehicle powertrain's operation;

means for causing the value of the selected category of information to be displayed on said multi-digit numerical display section in a cruising mode when the vehicle is being operated with the transmission in gear and the clutch engaged;

an information category indicator display section to indicate the particular selected category of information being displayed on said multi-digit numerical display section;

a prompting indicator display section;

means for sensing powertrain conditions to initiate a prompting mode by causing said prompting indicator display section to signal when shifting of the transmission from a presently selected gear to a different gear is desirable;

means to initiate a shifting mode by causing the identity of a target gear to which shifting of the transmission is desirable to be indicated on a particular one or more of the digits of said multi-digit numerical display section in response to initiation of shifting of the transmission from the presently selected gear;

and a further display section that is operable during shifting of the transmission to show when the engine has attained a speed that is substantially synchronous with the meshing speed of the particular target gear whose identity is displayed on said multi-digit numerical display section so that shifting of the transmission to the target gear can be completed substantially at the synchronous meshing speed of the target gear.

2. A display as set forth in claim 1 in which said information category selection means comprises a hierarchy defined by a principal category selection means and a sub-category selection means, and said information category indicator display section comprises a principal category indicator display section portion corresponding to the principal category selection means and a sub-category indicator display section portion corresponding to the sub-category selection means.

3. A display as set forth in claim 2 including switch means that are accessible by the driver of the vehicle by which the driver can select a particular category of information from said information category selection means.

4. A display as set forth in claim 3 in which said switch means comprises means for bi-directionally scrolling the principal categories of said principal category indicator display section portion in order to make a selection of the principal category and means for uni-directionally scrolling the sub-categories of said sub-category indicator display section portion in order to make a selection of the sub-category.

5. A display as set forth in claim 3 in which said switch means includes means for resetting certain values of certain selected sub-categories.

6. A display as set forth in claim 2 in which said principal category selection means comprises means for selecting fuel economy, engine speed, vehicle speed, travel time, travel distance, and engine running time, and said sub-category selection means comprises means for selecting total, goal, average, instantaneous, and remaining.

7. A display as set forth in claim 1 in which said prompting indicator display section comprises an upshift indicator for indicating that the transmission should be upshifted and a downshift indicator for indicating that the transmission should be downshifted.

8. A display as set forth in claim 1 in which said further display section comprises a target gear indicator that is disposed in association with the one or more digits of said multi-digit numerical display section that are used to indicate the identity of a target gear to which shifting of the transmission is desirable.

9. A display as set forth in claim 1 in which said further display section comprises a linear indicator that is operable in the shifting mode to graphically portray the instantaneous engine speed in relation to the synchronous meshing speed of the target gear 10. A display as set forth in claim 9 in which said linear indicator is operable in the cruising mode to show the level of fuel economy in relation to a particular fuel economy goal.

11. A display as set forth in claim 1 in which said further display section comprises a target gear indicator that is disposed in association with the one or more digits of said multi-digit numerical display section that are used to indicate the identity of a target gear to which shifting of the transmission is desirable, and a linear indicator that is operable in the shifting mode to graphically portray the instantaneous engine speed in relation to the synchronous meshing speed of the target gear.

* * * * *